United States Patent
Njoku et al.

(10) Patent No.: US 7,200,704 B2
(45) Date of Patent: Apr. 3, 2007

(54) VIRTUALIZATION OF AN I/O ADAPTER PORT USING ENABLEMENT AND ACTIVATION FUNCTIONS

(75) Inventors: Ugochukwu Charles Njoku, Bronx, NY (US); Frank W. Brice, Jr., Hurley, NY (US); David Craddock, New Paltz, NY (US); Richard K. Errickson, Poughkeepsie, NY (US); Mark S. Farrell, Pleasant Valley, NY (US); Charles W. Gainey, Jr., Poughkeepsie, NY (US); Donald W. Schmidt, Stone Ridge, NY (US); Gustav E. Sittmann, III, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 11/100,837

(22) Filed: Apr. 7, 2005

(65) Prior Publication Data

US 2006/0230219 A1 Oct. 12, 2006

(51) Int. Cl.
G06F 13/00 (2006.01)
G06F 13/173 (2006.01)
H04L 12/00 (2006.01)
(52) U.S. Cl. .............. 710/316; 710/100; 709/238; 709/250
(58) Field of Classification Search ......... 710/300, 710/104, 316, 36–38, 100; 713/2, 100; 709/229, 709/219, 213, 228, 200, 252, 305, 223, 238, 709/250; 711/5, 149, 153, 203; 707/101; 718/1
See application file for complete search history.

(56) References Cited

U.S. PATENT DOCUMENTS

| 6,260,120 | B1 * | 7/2001 | Blumenau et al. | 711/152 |
| 6,295,575 | B1 * | 9/2001 | Blumenau et al. | 711/5 |
| 6,421,711 | B1 * | 7/2002 | Blumenau et al. | 709/213 |
| 6,493,825 | B1 * | 12/2002 | Blumenau et al. | 713/168 |
| 6,502,162 | B2 * | 12/2002 | Blumenau et al. | 711/5 |
| 6,622,193 | B1 | 9/2003 | Avery | |
| 6,718,370 | B1 | 4/2004 | Coffman et al. | |
| 6,760,783 | B1 | 7/2004 | Berry | |

(Continued)

OTHER PUBLICATIONS

"The least choice first scheduling method for high-speed network switches" by Gura et al. (abstract only) Publication Date: Apr. 15-19, 2002.*

*Primary Examiner*—Gopal C. Ray
(74) *Attorney, Agent, or Firm*—Eugene I. Shkurko (57) ABSTRACT

A method for configuring a communication port of a communications interface of an information handling system into a plurality of virtual ports. A first command is issued to obtain information indicating a number of images of virtual ports supportable by the communications interface. A second command is then issued requesting the communications interface to virtualize the communication port. In response to the second command, one or more virtual switches are then configured to connect to the communication port, each virtual switch including a plurality of virtual ports, such that the one or more virtual switches are configured in a manner sufficient to support the number of images of virtual ports indicated by the obtained information. Thereafter, upon request via issuance of a third command, a logical link is established between one of the virtual ports of one of the virtual switches and a communicating element of the information handling system.

10 Claims, 6 Drawing Sheets

U.S. PATENT DOCUMENTS

| | | | |
|---|---|---|---|
| 6,799,255 B1 * | 9/2004 | Blumenau et al. | 711/152 |
| 6,988,130 B2 * | 1/2006 | Blumenau et al. | 709/213 |
| 7,051,182 B2 * | 5/2006 | Blumenau et al. | 711/202 |
| 7,093,021 B2 * | 8/2006 | Blumenau et al. | 709/229 |
| 2002/0141424 A1 | 10/2002 | Gasbarro et al. | |
| 2002/0144001 A1 | 10/2002 | Collins et al. | |
| 2003/0065856 A1 | 4/2003 | Kagan et al. | |
| 2003/0084241 A1 | 5/2003 | Lubbers et al. | |
| 2003/0131105 A1 * | 7/2003 | Czeiger et al. | 709/225 |
| 2004/0028043 A1 | 2/2004 | Maveli et al. | |
| 2004/0030745 A1 | 2/2004 | Boucher et al. | |
| 2004/0139236 A1 * | 7/2004 | Mehra et al. | 709/250 |
| 2004/0139240 A1 | 7/2004 | DiCorpo et al. | |
| 2004/0202189 A1 | 10/2004 | Arndt et al. | |
| 2004/0215848 A1 | 10/2004 | Craddock et al. | |
| 2005/0091358 A1 * | 4/2005 | Mehra et al. | 709/223 |
| 2006/0230219 A1 * | 10/2006 | Njoku et al. | 710/316 |

* cited by examiner

VIRTUALIZATION OF AN I/O ADAPTER PORT USING ENABLEMENT AND ACTIVATION FUNCTIONS

BACKGROUND OF THE INVENTION

The present invention relates to information processing systems and data communications systems, especially data communications interfaces of information processing systems.

The present invention is directed to an improved data processing system. More specifically, the present invention provides a system and method for providing multiple virtual host channel adapters using virtual switches within a physical channel adapter of a system area network.

In a system area network ("SAN"), such as a network in accordance with InfiniBand architecture ("IBA"), the hardware provides a message passing mechanism that can be used for input/output devices ("I/O") and interprocess communications ("IPC") between general computing nodes. Processes executing on devices access SAN message passing hardware by posting send/receive messages to send/receive work queues on a SAN host channel adapter ("HCA"). These processes are also referred to as "consumers."

The send/receive work queues ("WQ") are assigned to a consumer as a queue pair ("QP"). Consumers retrieve the results of these messages from a completion queue ("CQ") through SAN send and receive work completion ("WC") queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter ("HCA") and a target channel adapter ("TCA"). The host channel adapter is used by general purpose computing nodes to access the SAN fabric. Consumers use SAN verbs to access host channel adapter functions. Target channel adapters (TCA) are used by nodes that are the subject of messages sent from host channel adapters. The target channel adapters serve a similar function as that of the host channel adapters in providing the target node an access point to the SAN fabric.

The processing power and connectivity of medium and large scale computing systems, frequently referred to as servers or "mainframes", have recently experienced rapid increases. These improvements have been accompanied by improvements in the flexibility with which they can be programmed and used. Often it is beneficial to logically partition individual components and resources within such computing systems so as to support a plurality of operating system environments. Such logical partitioning allows each operating system, and applications operating within that operating system environment, to view the resources of the system as being dedicated to that operating system environment even though, in actuality, the resources are shared by a plurality of operating system environments. Such logical partitioning allows a system to support multiple different environments and thus, increases the versatility of the system while reducing the cost of maintaining the different environments by sharing of resources.

Building, operating and maintaining a large number of individual small scale computing systems, e.g., personal computers or "PCs" or even doing the same for mid-size computing systems involve significant costs in administering changes and updates to the hardware, operating systems, as well as administering changes and updates to applications which they support. These factors make the total cost of owning and operating such small- and mid-scale computing systems significant.

As the scale of server computer systems increases, it is desirable to further increase the flexibility of uses to which such systems can be put, by enabling support for a larger number of logical partitions on a single processor node of a SAN. A larger number of logical partitions will support a corresponding larger number of operating system images. Each operating system image, in turn, can support an environment tailored to the needs of a particular customer who uses the logical partition. Therefore, by providing facilities for creating and maintaining larger numbers of logical partitions, greater flexibility is provided such that the server computer can be shared among a great number of customers or customer uses when desired. Enabling larger numbers of logical partitions to be supported by one server helps assure that the processor resources and input/output resources of a server are best utilized.

SUMMARY OF THE INVENTION

According to an aspect of the invention, a method is provided for configuring a communication port of a communications interface of an information handling system into a plurality of virtual ports. In such a method a command is issued to obtain information indicating a number of images of virtual ports supportable by the communications interface. A command is issued requesting the communications interface to virtualize the communication port. In response to the command, one or more virtual switches are then configured to connect to the communication port, each virtual switch including a plurality of virtual ports, such that the one or more virtual switches are configured in a manner sufficient to support the number of images of virtual ports indicated by the obtained information. Thereafter, upon request, a logical link is established between one of the virtual ports of one of the virtual switches and a communicating element of the information handling system.

According to a preferred aspect of the invention, the communications interface includes an adapter and the command to obtain information is issued to the adapter in relation to the communication port. Preferably, the adapter is the element that is requested to virtualize the communication port. The one or more virtual switches are preferably configured by the adapter.

According to a particular aspect of the invention, the logical link is established by allocating a queue pair for general services interface purposes to each of the virtual port at respective ends of the logical link. In such case, each of the allocated queue pairs is configured to carry an alias identifier.

According to one aspect of the invention, the information handling system includes at least a processor, and the communicating element is an installed operating system image executable by the processor.

Preferably, the communications interface includes a host channel adapter, and the method further includes virtualizing the host channel adapter into a plurality of virtual host channel adapters. In such case, each of the virtual host channel adapters supports at least one installed operating system image.

In one preferred aspect of the invention, the communication port is a logical port of a logical switch, and the logical switch has a second logical port that is connected via a second logical link to a physical port of the adapter.

In a particularly preferred aspect of the invention, a plurality of the virtual switches are arranged in form of a tree network, and one of the virtual switches has one virtual port connected via a third logical link to the logical port of the logical switch.

DETAILED DESCRIPTION

Figure 1:
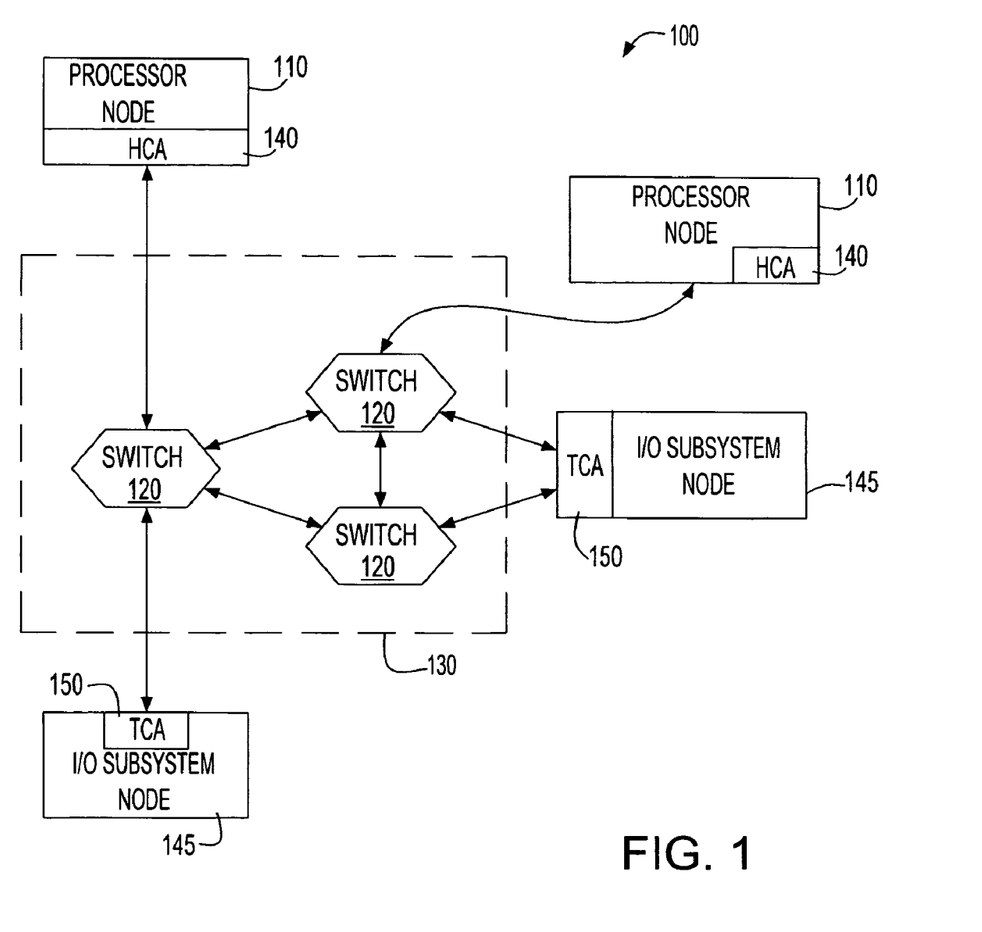
FIG. 1 is a diagram illustrating a system area network in accordance with one embodiment of the invention.

FIG. 1 is an illustration of a distributed computing system environment in accordance with InfiniBand architecture. While the embodiments of the invention are described herein in terms of a system area network (SAN) using InfiniBand architecture ("IBA"), the present invention is not limited to use of IBA and can easily be other type of infrastructures such as for example implementations that provide remote computer system connection through the internet or an intranet. It is also possible to implement the workings of the present invention to a variety of different computing system environments ranging from those that are simple and comprised of one or a few nodes and operating system(s) to complex system environments with the infrastructure that support many nodes and operating systems.

As shown in FIG. 1, a collection of end nodes 110 are connected to one another through a switch fabric 130 to form a subnet. Each subnet must have at least one subnet manager (not shown) that is responsible for the configuration and management of the subnet. As further shown in FIG. 1, each node connects to the fabric through a channel adapter 140 known as a host channel adapter ("HCA") 140 or a target channel adapter ("TCA") 150, in accordance with IBA. Each channel adapter 140 can also have one or more than one ports (not illustrated). In addition, a channel adapter with more than one port may be connected to multiple ports in the fabric (not illustrated), such as multiple switch ports. This allows multiple paths to exist between a source and a destination in an effort to reduce congestion and improve performance. The arrangement also allows for the better reliability in case of link failures. This arrangement also enables the ability to share storage devices, for example across multiple servers. I/O operations can also be performed between any two storage devices without direct involvement of the host server, therefore eliminating any unnecessary CPU utilization.

Figure 2:
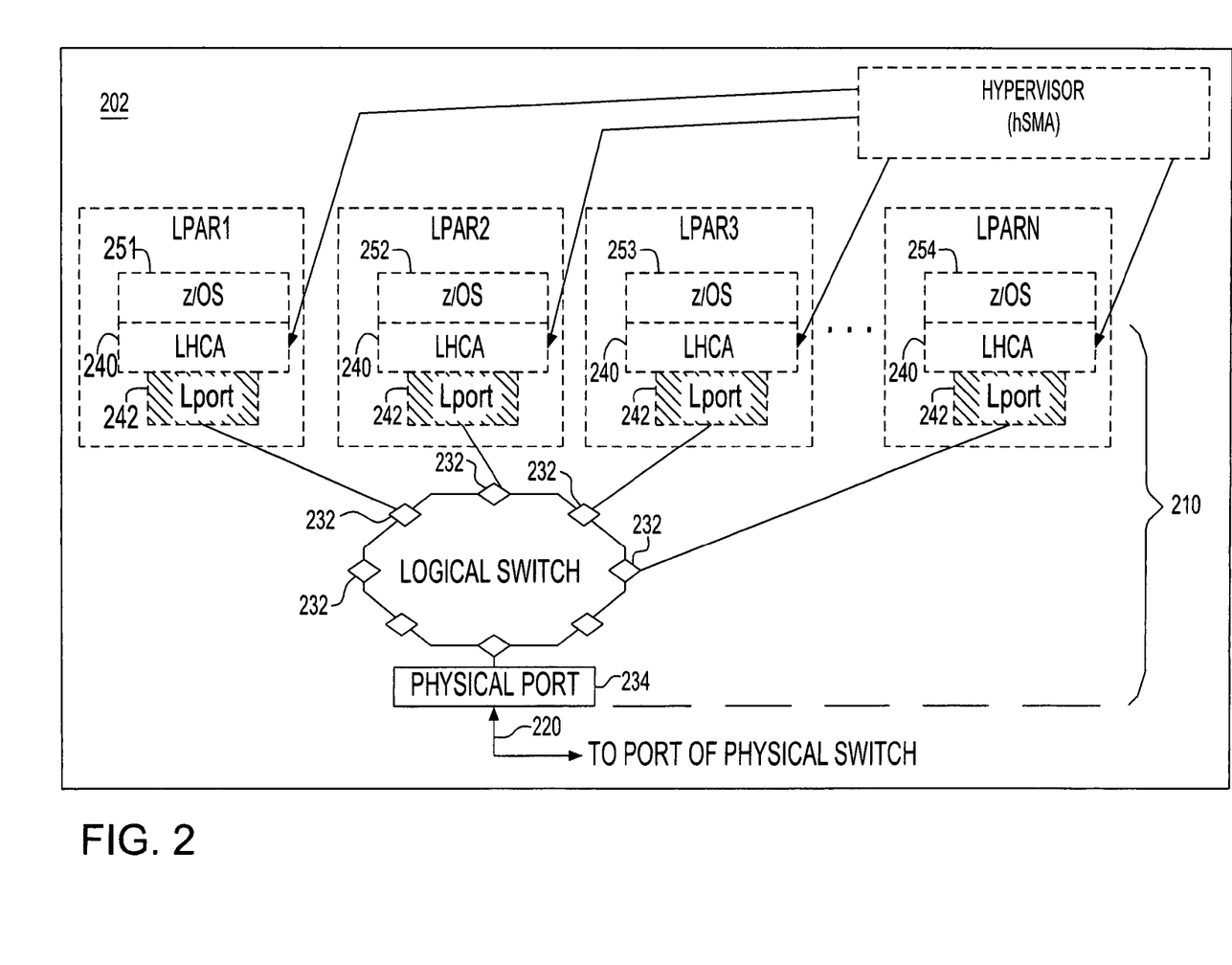
FIG. 2 is a block diagram illustrating an internal organization of a processor node in accordance with one embodiment of the invention.

FIG. 2 is a block and schematic diagram illustrating an arrangement of elements of an HCA 210 connecting one processor node 202 to a physical port of a physical switch 220 of an information processing system. Such arrangement is described in commonly owned U.S. patent application Ser. No. 10/441,448 filed Apr. 10, 2003, which was published as U.S. Patent Publication No. 2004/0202189 on Oct. 14, 2004. This application, which is not admitted prior art, is hereby incorporated by reference herein.

The HCA 210 includes both hardware, firmware and software-supported elements. As physical hardware of the HCA 210, a physical port 234 supports communications to a port of a physical switch, as shown at 220. In addition, the HCA 210 includes a logical switch 230 and a plurality of logical ports 232, which expand the capabilities of the physical port 234 by enabling establishment of logical partitions connected to respective ones of the logical port. The logical switch and logical ports are desirably implemented via hardware state machines. The logical switch routes communications between respective ones of the logical ports, in addition to utilizing the resources of the physical port for communications between the processor node 202 and other elements of the SAN via a physical switch 220 of the SAN's switch fabric.

With the addition of the logical switch 230, the number of operating system instances that the HCA 210 is capable of supporting is not limited to the number of physical ports 234 that are present in the HCA 210. With the provision of the logical switch, the HCA 210 can be configured into a plurality of logical partitions LPAR1, LPAR2, LPAR3, . . . , LPARN, each capable of supporting an instance of an operating system. Within each logical partition, the instance of the operating system executed therein and applications thereon view the computing system (i.e., the processing and input output resources available to it) as being dedicated to that operating system and applications and do not have knowledge of other logical partitions of the system. Thus, each operating system instance and other parameters of each LPAR can be configured to provide a computing environment which is tailored to the particular use to which that computing environment is put.

In order for each LPAR to have an architecturally accurate view of the host channel adapter, an image of a logical host channel adapter ("LHCA") 240 is created for each LPAR which appears as being dedicated to a single LPAR. The LHCA 240 for each LPAR is configured to possess one or more logical ports ("L-ports") 242 which are attached to logical ports 232 of the logical switch 210. In turn, the logical switch 230 is connected to the physical port 234 of the HCA.

The HCA 210 includes a set of InfiniBand architected resources for queuing of entries related to communications traffic on each of its logical ports 232, such resources including work queue pairs, i.e., a pair of a send work queue and a receive work queue. Another such architected resource is a special queue pair set aside for recording and handling entries related to changes or events which affect the operation of or allocations of resources within the logical partition, and another special queue pair set aside for recording and handling InfiniBand architected general service interface ("GSI") entries. In accordance with Infiniband architecture, such queue pairs must always be designated as queue pairs "zero" and "one" or "QP0" and "QP1", respectively. In addition to these architecturally designated resources, other architected resources are utilized in each LHCA in support of the LPAR, such as additional queue pairs for managing communications between LHCAs, as well as resources which are not architected by the Infiniband architecture such as event queues.

Each LHCA 240 supports execution of one operating system image. Thus, the four LHCAs 240 depicted in FIG. 2 support the execution of four operating system images 251, 252, 253, and 254, as one operating system image per each LHCA. Each operating system image is capable of being an image of one of z/OS®, LINUX, AIX®, UNIX®, VM™, MVS™, or other operating system, which is executed in one logical partition ("LPAR") supported by a corresponding one of the LHCAs. z/OS, AIX, VM and MVS are trademarks or registered trademarks of International Business Machines Corporation and UNIX is a registered trademark of Unix System Laboratories, Inc. For each operating system image, either the same or different operating systems can be executed. In the particular implementation shown, a combination of the same and different operating system images are executed. In the example shown, two (251, 253) of the operating system images are z/OS operating system images and two others (252, 254) of the operating system images are LINUX operating system images.

In the HCA 210 implemented in accordance with FIG. 2, the number of operating system images that can be supported by the HCA correspond to the number of L-ports 232 the logical switch 230 is configured to support. For example, a logical switch 230 of a host may support a maximum of 253 logical ports (232). As mentioned above, the logical switch may be implemented in hardware, e.g., via hardware state machines. Thus, in this example, without making a change in the hardware, the number of logical partitions that can be supported by a physical port 234 of the HCA is limited to the number of supported logical ports, i.e., 253.

Accordingly in a more particular embodiment of the invention, a way is provided of increasing the number of logical partitions that can be supported on a processor node of a SAN, without being limited to a number of logical ports of a pre-existing logical switch whether implemented in hardware or otherwise. Thus, as described in the following, the number of supported logical partitions is increased up to a maximum that is constrained only to the extent of resources allocated thereto and supported by firmware of the processor node. By increasing the number of logical partitions that are supported by one processor node, the computing and I/O resources of the processor node can be configured to support a large number of potentially different environments, each of which can be customized to a particular customer's needs. This, in turn, can help to lower the total cost of meeting the customer's computing needs because the resources of the server can be utilized effectively to provide large numbers of operating system images in a corresponding large number of environments tailored to the customer's needs.

Accordingly, processor nodes of a system area network can be logically partitioned to a much greater degree than that permitted before. By enabling processor nodes to operate with a large number of logical partitions supporting potentially different requirements, a processor node can support a greater number of different computing environments supported by operating system images in different logical partitions. This supports a greater degree of pooling, central planning and management of resources by processor monitoring systems and professional system administrators. These considerations lower the total cost of providing the different computing environments to a point lower than that of owning and separately maintaining individual and separate computing system hardware for each environment.

Figure 3:
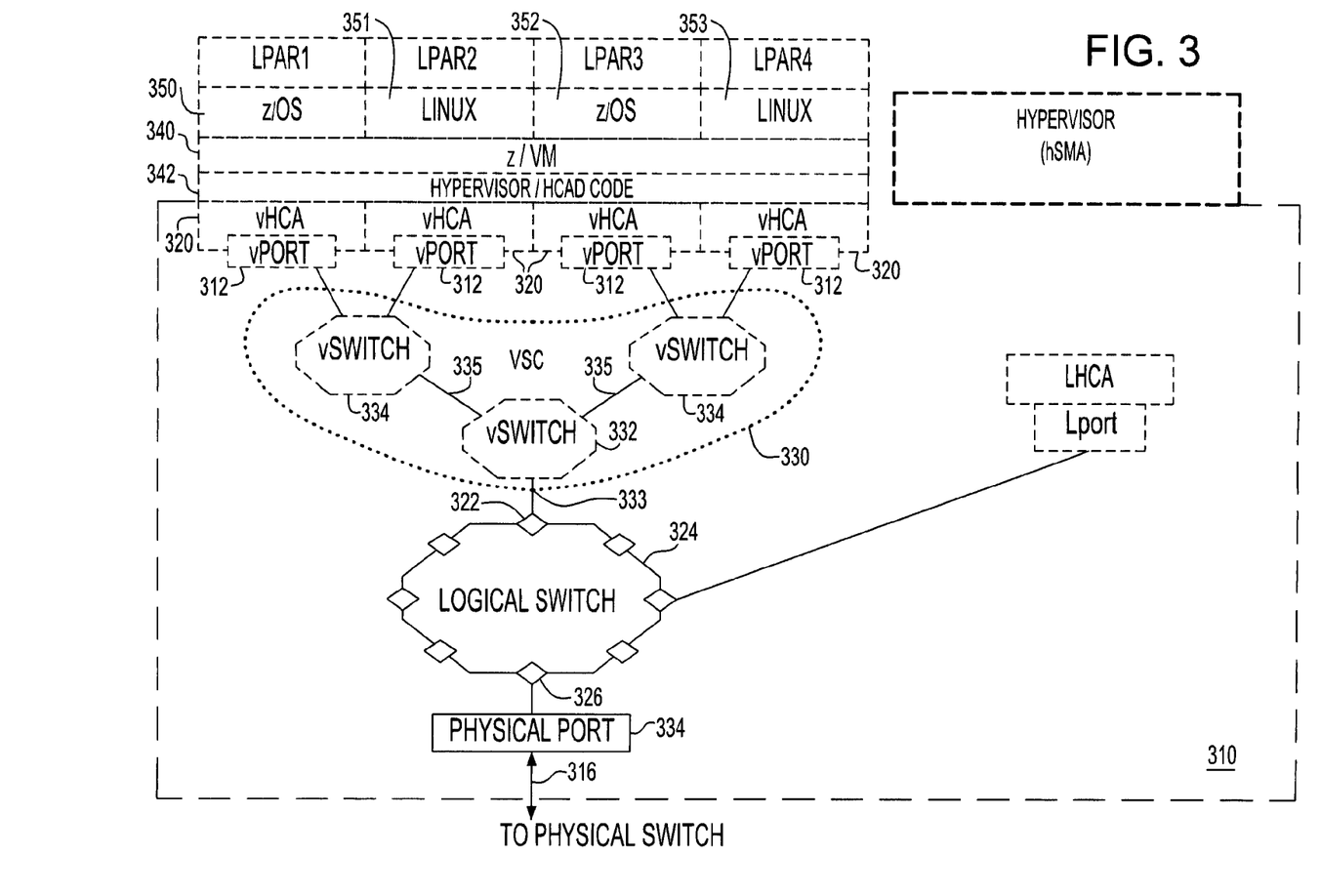
FIG. 3 is a block diagram illustrating an internal organization of a processor node in accordance with a particular preferred embodiment of the invention.

FIG. 3 is a diagram illustrating an arrangement according to an embodiment of the invention. In this arrangement, a virtualized HCA 310 supports communications of a number of operating system images 350, 351, 352, and 353 which are executed on a processor node of an information handling system. One particular system area network in accordance with a preferred embodiment is shown and described below with reference to FIG. 5. As in the system area network 100 (FIG. 1) described above, each processor node of the system may include one or more processors. Each processor node is configurable to execute multiple operating system images in multiple logical partitions ("LPARs") resident on the processor node.

In an extension of the arrangement shown and described with reference to FIG. 2 above, the virtual HCA 310 shown in FIG. 3 includes a number of virtual ports 312 which are connected to a physical port 334 of the HCA 310 by way of a logical switch 324. The logical switch is part of the firmware managed configuration of the HCA 310. According to this embodiment, the number of operating system images that can be supported by the virtualized HCA 310 are not limited to the number of available logical ports of a logical switch 324, as they are in the arrangement shown in FIG. 2. Rather, the number of supported operating system images is limited only by the number of virtual port images that the HCA adapter hardware is capable of supporting, based on the amount of available resources that the HCA adapter hardware has.

"z/VM"® is used to refer to a particular operating system designed to operate on large scale computing systems, especially those which are sold under the mark zSeries® (registered trademarks of International Business Machines Corporation). z/VM has a special characteristic of being usable as a "first-level" operating system 340 capable of supporting a plurality of second-level operating systems which are executed in different LPARs of a processor node of the SAN. In this embodiment, z/VM is used as a first-level operating system supporting the execution of a plurality of second level operating system images, i.e., z/OS images 350, 352 and Linux images 351 and 353. The z/VM operating system 340 executes above a layer of code in which the hypervisor and HCA driver code ("HCAD") 342 reside. The hypervisor is a set of code for controlling the allocation of resources, e.g., access to certain tables and operating system spaces within memory, as well as the communication resources, e.g., ports and queue pairs of the HCA. The hypervisor has higher privileges than any operating system on the processor node. This permits the hypervisor allocates resources to respective LPARs of the processor node in way that prevents allocations to different LPARs from conflicting. The HCAD 342 is used as an interface between the z/VM first level operating system and the hardware and firmware which supports the HCA 310.

The virtualized HCA 310 shown in FIG. 3 includes a plurality of virtual HCAs ("vHCAs") 320. Herein, the term "virtualized" HCA is used to refer to a physical HCA which has been configured to support a number of virtual ports or "vPorts" 312. By contrast, the term "virtual HCA" or "VHCA" 320 is used to refer to a virtual image of the HCA which supports communications required by a particular operating system image, e.g., z/OS image 350 which is executed in a particular logical partition ("LPAR1") of the processor node.

As shown in FIG. 3, the vHCAs 320 of the HCA 310 have respective vPorts 312 which allow the vHCAs to send and receive communications, e.g., messages, over a plurality of respective activatable logical links to a virtual switch cluster ("VSC") 330. In turn, the VSC 330 has one or more logical links connected to one or more logical ports 322 of a logical switch 324. In the embodiment shown in FIG. 3, the VSC includes three virtual switches. One virtual switch 332 supports communications through a logical link 333 connected to a logical port 322 of the logical switch 324, which, in turn has a logical link to a physical port 334 of the HCA adapter hardware. The physical port has a physical link 316 to a port of a physical switch of a switch fabric which supports inter-host communications. In the particular arrangement shown in FIG. 3, two other virtual switches 334 support communications by way of logical links 335 to and from the one virtual switch 332 that is connected to the logical switch 324. These two other virtual switches 334 support communications through logical links 337 to the virtual ports 312 of the vHCAs for the respective operating system images that reside on the processor node 110.

While only a few virtual are illustrated in the particular example shown in FIG. 3, the virtual HCA can be figured to support any number of virtual ports up to the limit that the available adapter resource can support. In addition, the number of virtual switches 332 and 334 that appear in each virtual switch cluster 330 varies according the number of virtual ports supported by the virtualized HCA 310. by way of example, if the HCA has capabilities to support one thousand virtual ports, and each virtual switch 332 and 334 can support communication up to some maximum number of virtual port, for example 253 virtual ports, then there needs to be at lease four virtual switches 334 which connect to the virtual ports 312 which support the respective vHCAs, and one additional virtual switches 332 connected via logical links 335 to to the four virtual switches 332, for connection to logical port 322 of logical switch 324.

Figure 4:
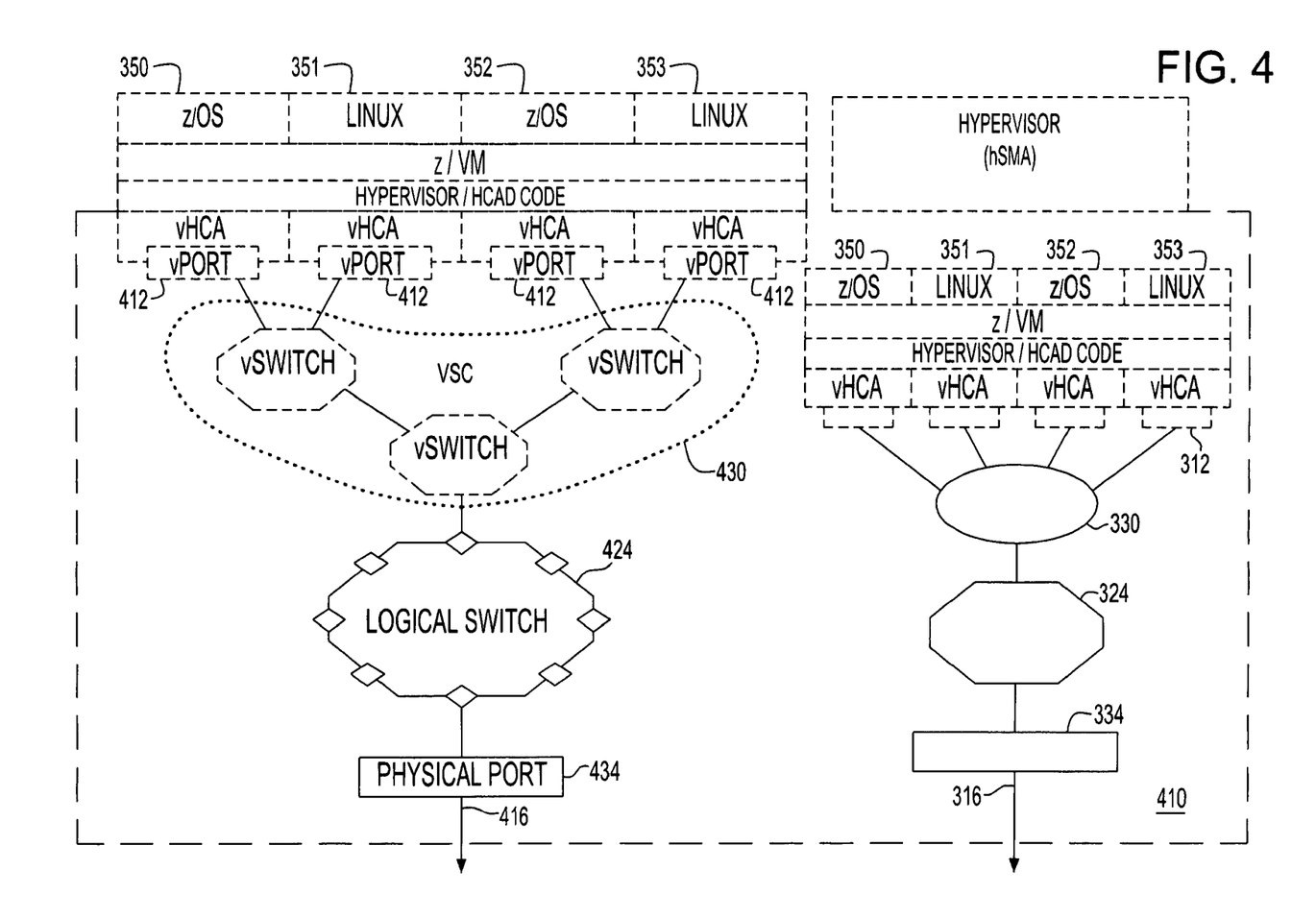
FIG. 4 is a block diagram illustrating an internal organization of a processor node in accordance with another particular preferred embodiment of the invention.

In a particular arrangement shown in FIG. 4, the operating system images 350, 351, 352, and 353 are not limited to to each being capable of communicating through only one virtual port 312, one virtual switch cluster 330 and one logical switch 324, and one physical port 334 of the HCA, which are are those shown and described above relative to FIG. 3. In addition to these primary network communication links, it is desirable to provide support for additional communications links for each of the operating system images, in case of failure of any of the ports and/or logical link which connect the operating system images to the final link 316 to the switch fabric. Accordingly, in the virtualized HCA 410 shown in FIG. 4, the same operating system images 350, 351, 352, and 353 are also provided additional activatable communication capabilities to a different physical port 434 having a different logical link 416 to the switch fabric. The additional communication capabilities are provided through additional virtual ports 412, as well as by logical links through another virtual switch cluster 430 having characteristics similar to that described above of virtual switch cluster 330, and through another logical switch 424 similar to logical port 324. In this case, at least some of the additional logical links from some of the virtual ports 412 of some vHCAs supporting operating system images need not be activated until the additional logical links are required to be used, i.e., such as in the case of a failure of a logical link or other resource which supports communication along the primary network communications links.

Figure 5:
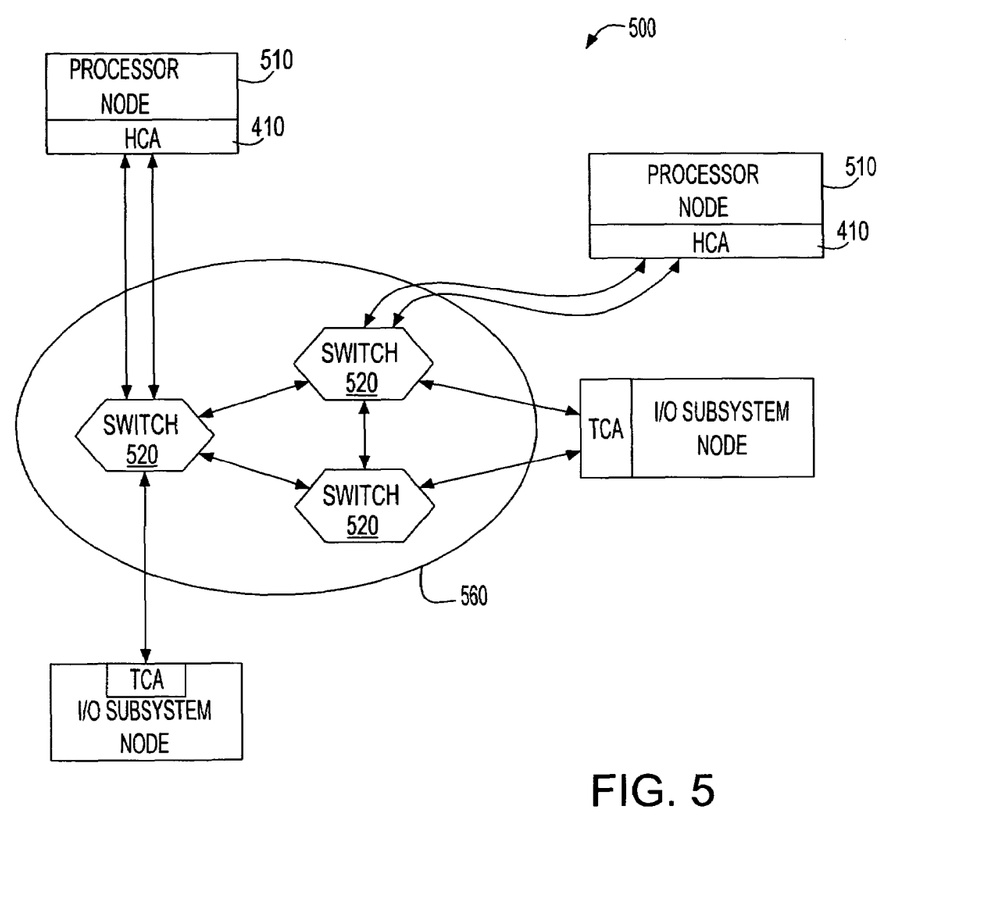
FIG. 5 is a diagram illustrating a system area network in accordance with the embodiment of the invention illustrated in FIG. 4.

FIG. 5 illustrates a system area network 500 according to a preferred implementation of the invention, which utilizes the virtualized HCA 410 shown in FIG. 4. Accordingly, a virtualized HCA supporting each processor node 510 has communication paths through at least two different physical ports to a switch 520 of the switch fabric 560 supporting the system area network. Taken together with the preferred network topology described above relative to FIG. 4, each communication path via each physical port to the switch fabric 560 supports potentially activatable logical links between each of a plurality of operating system images utilizing respective vHCAs of the system area network 500 and the switch fabric.

The vHCAs are used in the following manner. In order for an application to communicate with another application over the SAN, the application must first be allocated a queue pair (QP) that consists of a send work queue and a receive work queue. To execute a communication operation, the application must then place a work queue element ("WQE") in the send work queue. An example of such communication operation is the sending and receiving of a message containing one or more packets between respective processor nodes of the SAN. After the WQE has been placed in the send work queue, the communication operation is picked up for handling by the HCA. In this way, the QP forms the communications medium between applications and the HCA, thus relieving the operating system from having to deal with this responsibility. Each process may create one or more QPs for communications purposes with other applications. In such manner, IBA provides a message passing mechanism that can be used for I/O devices and interprocess communications between the processor nodes 210.

Processes, e.g., applications executing on processor nodes and devices can thus utilize the message passing interface of the HCA by posting send and receive WQEs to the send work queue and the receive work queue of a respective vPort of the HCA. As mentioned above, these processes are referred to as "consumers." A consumer can be defined as a direct user of verbs. Verbs are abstract descriptions of the functionality of a channel adapter. Consumers subsequently receive the results of handled WQEs as completion queue elements (CQE) posted to completion queues (CQs).

The physical HCA hardware and firmware support the creation, connection and use of logical switches having logical ports. In addition, the HCA hardware and firmware includes the resources and facilities by which virtual switches and virtual ports can be set up and used, as well. Details describing an exemplary way of providing connectivity through virtual switches and virtual ports of an information processing system are described in commonly owned U.S. patent application Ser. No. 11/100,846, filed Apr. 7, 2005 which names Richard Erickson et al. as inventors. Said application is hereby incorporated herein by reference.

However, configuration and activation functions by which these facilities can be effectively enabled to accomplish sharing of the HCA among a number of sharing operating system images are required. In the embodiments of the invention described below, enablement and activation command functions are used to configure an adapter port into multiple port images and then establish logical links to provide the required logical connectivity between virtual ports of virtual switches, and between such virtual ports and logical switches.

According to an embodiment of the invention, a set of new Call-Logical-Processor (CLP) commands are provided. These new CLP commands can be used at different levels to manage the initialization and configuration of the HCA. These commands are used to perform subnet management agent (SMA) and general services agent (GSA) functions on behalf of all logical elements of the HCA.

The following CLP commands listed below fall under the three different groups. The first group contains list command and query commands for determining the capabilities of the HCA to support virtual switch clusters and virtual ports.

List-Adapter: Before the program can use an HCA, the list-adapter command is used to inform the program of recognized adapters that it can use.

List-Adapter-Privileged: This is used by an authorized program to obtain a list of adapters on a system scope.

Query-Adapter-Attributes: Information regarding the capabilities of an HCA is determined by issuing this command against the designated adapter.

Query-Adapter-Configuration: Before a program begins to use an HCA, information regarding specific capabilities of the HCA that are available to the program is available by issuing this command.

Query-Adapter-Port: Information regarding the attributes of an HCA port is available by issuing this command.

After the capabilities of the HCA are determined, the second group of commands is used to create the virtual switch cluster and to define resources that support the virtual port constructs in the HCA. These commands include:

Define-Adapter-Role: As part of initialization, this command is issued against an HCA to designate and establish a role it plays.

Define-Alias-QP1: Before a program can access and use the HCA resources for data transmission, this command is issued to initialize the link and make the logical port active.

Attach/Detach Multicast-QP: For a program to participate in multicast operations, the program must issue this command to have its QP attached to, or detached from a multicast group.

The third group of commands supports the diagnostic functions relating to the virtualization of the HCA. These commands include:

Get/Set Adapter Attributes: Multipurpose functions, used to read from, or write to super privilege area of the HCA. Provides both performance and diagnostic data.

Store-Adapter-Notification: When HCA related events are made pending, this command is used to obtain the information regarding the event.

Query-Adapter-Resource-Allocation: Provides an authorized program, information regarding the assignment of HCA resources.

Store-Logical-Processor-Characteristics: This is a utility function to determine which CLP commands are installed in the system.

The use of these commands will now be described in detail.

Virtualization is a prerequisite in some types of server computer systems, in order to support logical partition and virtual machine environment. The CLP commands provide the virtualization enablement function required to make the HCA sharable among multiple operating system images. The HCA architecture provides special facilities to make the HCA appear as multiple instances of channel adapter within a physical HCA. To provide enablement and management support for the virtualization of the HCA in a logical partition and virtual machine implementations, two special CLP commands, the define-adapter-role, and define-alias-QP1 are provided.

Each logical structure associated with the HCA must be assigned with a unique local port identifier ("LID"). A LID is a 2-byte flat address assigned to a port by the Subnet Manager. Every logical port and every virtual port in a subnet managed by a subnet manager must have a valid LID assigned to it before traffic can flow through that port. The define-alias-QP1 function initiates the logical port and link initialization function of the HCA, as will be described more fully below.

The define-adapter-role is used as part of initializing the HCA. The define-adapter-role function is a privileged command that a program executing on the host must issue to enable multiple operating-system image support (second-level operating systems) requiring access to the HCA and its resources. This privileged command is issued by a hypervisor and/or HCA driver layer of the programs resident on the processor node, as these programs have higher privileges, i.e., higher authority to issue commands involving changes in configuration than other programs such as the first and second-level operating systems which execute in layers of programs which overlie the hypervisor and/or HCA driver. Prior to using the HCA, this command is used to establish the adapter's role. By setting the role to either default HCA structure, or as a virtual switch cluster, the behavior of the adapter is established. However, to achieve a given HCA behavior requires machine resources. A key resource, an "alias QP1", is allocated to support the function of a virtual port of the virtual switch cluster by a separate command: "define-alias QP1" issued after the virtual switch cluster has been formed.

The define-adapter-role provides enablement for nested virtualization. This is the key command by which nested virtualization is accomplished. By this command, each of the logical ports 322 of the logical switch 324 (FIG. 3) can be enabled to perform as a switch cluster. The command provides the necessary data to the hypervisor to perform this function. When this command is issued, a microcode enabled virtual switch cluster (VSC) is formed which is mapped to a particular logical port 322 (FIG. 3) of the HCA.

When the define-adapter-role command is used to enable an HCA as a virtual switch cluster, a logical port of the logical switch is reconfigured into a virtual switch. This command is issued in relation to a particular logical port 322 (FIG. 3) of the logical switch 324 in the HCA. The define-adapter-role provides the configuration and enablement function required to configure an HCA to perform as a virtual-switch by replicating the logical port into multiple virtual ports or set of virtual ports. This function establishes whether an adapter port functions to support a limited number of operating system images or a much larger number of operating system images on a host.

However, before the define-adapter-role command is issued, the host program-needs to obtain information concerning the capabilities of the HCA to support a virtual switch cluster. Such information is obtained by the host program issuing one or more commands from the set of query commands indicated above.

When a large number of operating system images are enabled by the define-adapter-role command, these second-level operating system images are not yet enabled to access the HCA resources. While the define-adapter-role command establishes a virtual switch cluster within the HCA (assuming that resources of the HCA support such virtual switch cluster), this command does not assign or initiate the assignment of the LID to a virtual port. A second command must be issued before the second-level operating-system images can access the HCA resources via the virtual HCAs. The second command is the define-alias-QP1 command that is used to activate the virtual port. Each operating system image that requires access to the HCA must issue the define-alias-QP1 CLP command. The define-alias-QP1 command is invoked to clone a regular queue pair ("QP") resource into a special QP1 that implements the general services interface ("GSI" interface, thereby providing multiple operating systems accessibility to the HCA. The cloned QP1 (alias-QP1) is assigned to a logical port or virtual port associated with the logical partition. The define alias-QP1 function initiates the logical port and link initialization function of the HCA. The define alias-QP1 is a synchronous operation that initiates an asynchronous process. The synchronous portion of the command completes when the alias-QP1 is created. The asynchronous portion of the command is successfully completed when the LID is assigned to the specified port by the subnet manager, and logical connectivity is established and a notification event is presented to the HCA.

Once the define-adapter-role command has been issued against a particular logical or physical port of the HCA, the command cannot be issued against that port again until the HCA is reset. This helps to assure that the image of the HCA port and switch configuration that appears to each program on the host does not change without notice or arbitrarily, so that such program can establish virtual ports of an already established virtual switch cluster when needed. Likewise, once a particular queue pair is reserved for use as an alias-QP1, such queue pair cannot be reassigned again until the HCA is reset.

Figure 6:
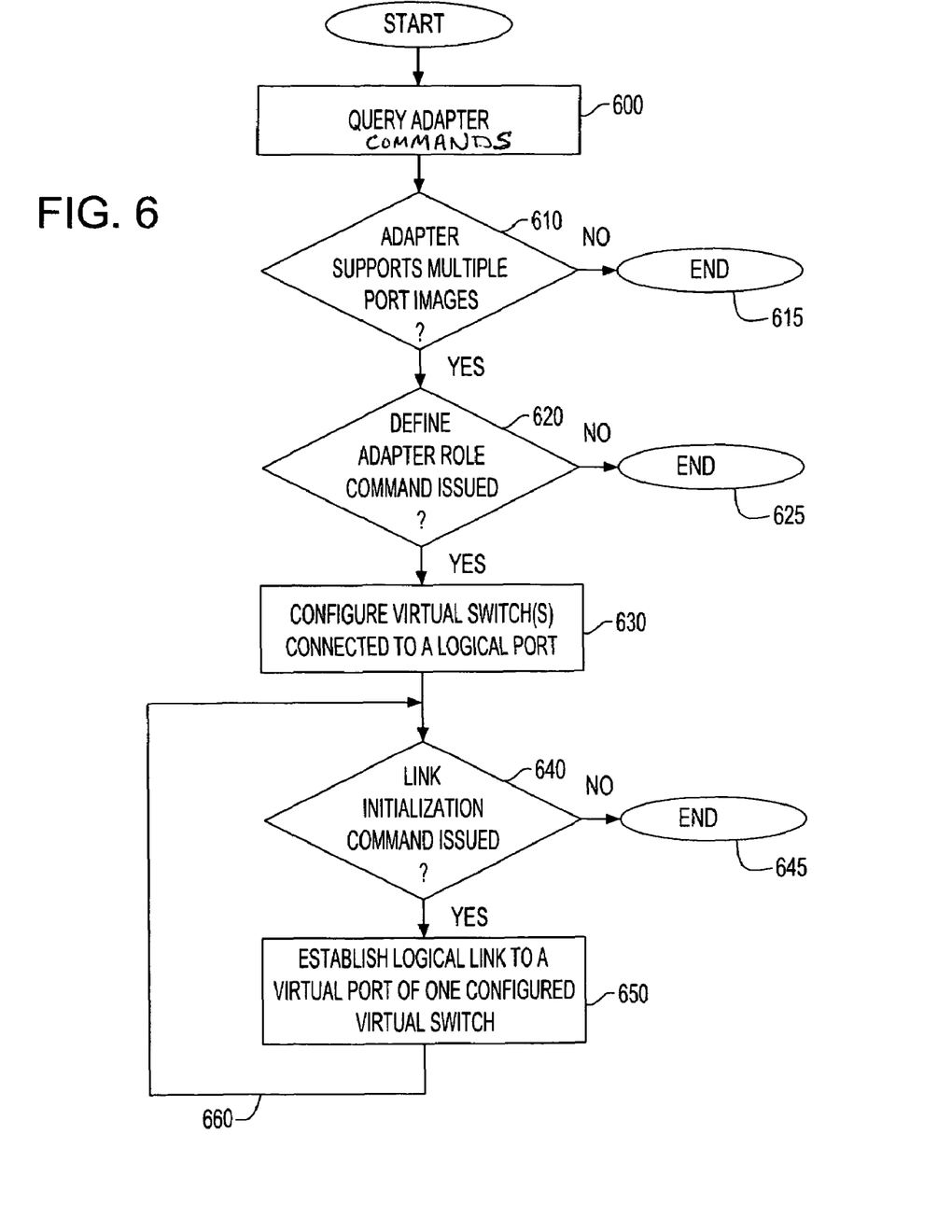
FIG. 6 is a flow diagram illustrating a method of establishing one or more virtual switches and virtual ports supported for communication thereby within a virtualized channel adapter in accordance with one embodiment of the invention.

FIG. 6 illustrates a flowchart of operation in accordance with an embodiment of the invention. Accordingly, in a method of establishing a virtualized channel adapter in accordance with an embodiment of the invention, in step 600, one or more commands from the set of above-described query commands is issued by a host program, e.g., a hypervisor or other high-privileged program to the channel adapter to determined the capabilities of the adapter for supporting a virtualized channel adapter. From the information obtained by way of a response from the channel adapter, the high-privileged program determines in step 610 whether the channel adapter supports multiple port images, i.e., whether the response is that more than one unassigned port image is supported.

When it is determined that the channel adapter does not support multiple port images, the method cannot go any farther, and thus is at an end (615). When it is determined that the channel adapter does support multiple port images, the method allows step 620 to be performed in which the host program issues the define-adapter-role command to the channel adapter to establish a virtualized channel adapter. Note that the query adapter functions (step 600) and the define-adapter-role command are preferably performed as two separate commands. In such manner, the host program can issue query commands to several different existing logical or physical ports of the channel adapter without being committed to virtualizing the channel adapter against any particular one of the queried ports. This permits the host program to first determine which port or ports have sufficient capabilities to support an intended virtualized configuration and then postponing issuance of the define-adapter-role command until after making such determination.

If the define-adapter-role command is not issued, then the method comes to an end (step 625). When the define-adapter-role command is issued, in step 630 one or more virtual switches are configured to be connected to a port of the channel adapter, such port preferably being an existing logical port but which, instead, can be a physical port.

Thereafter, in step 640 the method awaits issuance of a link initialization command. The define alias-QP1 command is such link initialization command. If such command is never issued, the method proceeds no further (step 645). Ultimately, the define-alias-QP1 command must be issued to establish a one or more virtual ports and logical links connecting the one or more virtual ports in order for one or more operating systems to utilize the services of the virtualized configuration. However, such command can be issued at any appropriate time in which activity on the processor node permits such change in the virtualized channel adapter configuration, which occurs after the time at which the HCA is reset. Thus, a further step (650) in the method occurs when a logical link is established to a virtual port of one virtual switch that was configured in step 630 by issuance of the define-adapter-role command. Thereafter, as indicated by arrow (660), the method proceeds by the establishment of one or more additional logical links to one or more additional virtual ports of a virtual switch. As indicated above, establishment of such additional one or more logical links can occur at any appropriate time in which activity in the virtualized configuration permits.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method for configuring a communication port of a communications interface of an information handling system into a plurality of virtual ports, comprising:
   issuing a command to obtain information indicating a number of images of virtual ports supportable by said communications interface;
   issuing a command requesting said communications interface to virtualize said communication port;
   in response to said command, configuring one or more virtual switches to connect to said communication port, each said virtual switch including a plurality of virtual ports, said one or more virtual switches configured in a manner sufficient to support said number of images of virtual ports indicated by said obtained information; and
   thereafter, upon request, establishing a logical link between one of said virtual ports of one of said virtual switches and a communicating element of said information handling system.

2. The method as claimed in claim 1, wherein said communications interface includes an adapter and said command to obtain information is issued to said adapter in relation to said communication port.

3. The method as claimed in claim 2, wherein said adapter is requested to virtualize said communication port.

4. The method as claimed in claim 3, wherein said one or more virtual switches is configured by said adapter.

5. The method as claimed in claim 1, wherein said logical link is established by one or more steps including allocating a queue pair for general services interface purposes to each said virtual port at respective ends of said logical link.

6. The method as claimed in claim 5, wherein each of said allocated queue pairs is configured to carry an alias identifier.

7. The method as claimed in claim 6, wherein the information handling system includes at least a processor, and the communicating element is an installed operating system image executable by said processor.

8. The method as claimed in claim 7, wherein said communications interface includes a host channel adapter, the method further comprising virtualizing said host channel adapter into a plurality of virtual host channel adapters, each of said virtual host channel adapters supporting at least one said installed operating system image.

9. The method as claimed in claim 1, wherein said communication port is a logical port of a logical switch, said logical switch having a second logical port connected via a second logical link to a physical port of an adapter.

10. The method as claimed in claim 9, wherein said one or more virtual switches includes a plurality of said virtual switches arranged in form of a tree network, one of said virtual switches having one of said virtual ports connected via a third logical link to said logical port of said logical switch.

* * * * *